United States Patent [19]
Pet

[11] Patent Number: 5,835,912
[45] Date of Patent: Nov. 10, 1998

[54] METHOD OF EFFICIENCY AND FLEXIBILITY STORING, RETRIEVING, AND MODIFYING DATA IN ANY LANGUAGE REPRESENTATION

[75] Inventor: Mandy Suzanne Pet, Ellicott City, Md.

[73] Assignee: The United States of America as represented by the National Security Agency, Washington, D.C.

[21] Appl. No.: 815,668

[22] Filed: Mar. 13, 1997

[51] Int. Cl.⁶ .................................................. G06F 17/28
[52] U.S. Cl. ................. 707/104; 707/3; 707/4; 704/2; 704/7; 704/10
[58] Field of Search .................. 707/104, 3, 4; 704/2, 10, 7

[56] References Cited

U.S. PATENT DOCUMENTS

| | | | |
|---|---|---|---|
| 4,566,078 | 1/1986 | Crabtree | 364/900 |
| 5,148,541 | 9/1992 | Lee et al. | 395/600 |
| 5,428,772 | 6/1995 | Merz | 395/600 |
| 5,442,782 | 8/1995 | Malatesta et al. | 395/600 |
| 5,497,319 | 3/1996 | Chong et al. | 364/419.02 |
| 5,523,946 | 6/1996 | Kaplan et al. | 364/419.02 |
| 5,678,039 | 10/1997 | Hinks et al. | 395/604 |

OTHER PUBLICATIONS

Ballesteros et al. "Phrasal Translation and Query Expansion Techniques for Cross–Language Information Retrieval" SIGIR 97, pp. 84–91, Mar. 1997.

Sheridan et al. "Experiments in Multilingual Information Retrieval using the Spider System" SGIR 96, pp. 58–65, Aug. 1996.

Sakaguchi et al. "A Browsing Tool for Multi–Lingual Documents for Users Without Multi–lingual Fonts" DL 96, pp. 63–71, Apr. 1996.

Maybee et al. "Multilanguage Interoperability in distributed Systems" Proceedings of ICSE–18, pp. 451–463, May 1994.

*Primary Examiner*—Thomas G. Black
*Assistant Examiner*—Michael J. Wallace, Jr.
*Attorney, Agent, or Firm*—Robert D. Morelli

[57] ABSTRACT

The present invention is a method of storing, retrieving, and modifying data in a database by creating data records in a user-definable language representation, where each data record has an identifier, where each data record includes data fields and attribute fields, where each data field and attribute field is identified by a name, and where the name does not have to be used by another user; storing each data field and attribute field on a separate line in a data item table along with the data record identifier, the field name or attribute name, and a language representation identifier; retrieving the data record, data field or attribute field in the language representation used to store the same; and modifying, adding, or deleting the data record, the data field, or the attribute field using a user-definable language representation, where the language representation may be different from the language representation used to store the item.

15 Claims, 3 Drawing Sheets

DATA ITEM TABLE

| Record # | Field Name | Attribute # | Lang. Rep. # | Data | Reverse Data |
|---|---|---|---|---|---|
| 1 | 1 | | 1 | dog | god |
| 1 | 1 | | 3 | chien | neihc |
| etc. | etc. | etc. | etc. | etc. | etc. |

LANGUAGE TABLE

| Language # | Language Name |
|---|---|
| 1 | English |
| 2 | French |
| 3 | Arabic |
| etc. | etc. |

FIG. 2

LANGUAGE REPRESENTATION TABLE

| Language # | Language Representation # | Language Representation |
|---|---|---|
| 3 (Arabic) | 1 | ISO-8859-6 |
| 3 | 2 | SATTS Transliteration |
| 2 | 3 | French Alphabet |
| etc. | etc. | etc. |

FIG. 3

DATA ITEM TABLE

| Record # | Field Name | Attribute # | Lang. Rep. # | Data | Reverse Data |
|---|---|---|---|---|---|
| 1 | 1 |  | 1 | dog | god |
| 1 | 1 |  | 3 | chien | neihc |
| etc. | etc. | etc. | etc. | etc. | etc. |

FIG. 4

METHOD OF EFFICIENCY AND FLEXIBILITY STORING, RETRIEVING, AND MODIFYING DATA IN ANY LANGUAGE REPRESENTATION

FIELD OF THE INVENTION

The present invention relates to data processing and, more particularly, to a method of efficiently and flexibly storing, retrieving, and modifying data in any language representation.

BACKGROUND OF THE INVENTION

"Data processing facilities have to handle a large variety of files. In the past each file was treated as an independent entity even though elements of its data structure might be identical to those in another file or two files might contain data that were related in some fashion. There were a multiplicity of applications programs written to process data from the files. If a data record had to be changed, the impact would affect a number of existing application programs in ways that were not obvious. The effect of hardware changes, such as adding new disc drives, could be devastating to the existing programs. In response to problems like these, the need for integrating data into data bases and for building generalized data-handling and data-management facilities became apparent. The result was the creation of software systems that became known as data-base management systems (DBMS).

The DBMS design has to provide a number of features. Concurrency of operations and avoidance of deadlocks are essential, since many users may have to access the same data at the same time. Data integrity and data security are of great concern because the database is a very valuable commodity to its owners and users. Data independence, the ability to make logical changes in the data base or physical changes in the hardware on which it resides without significantly affecting the users and their applications programs, is also important . . . there are three levels of data descriptions in the system. The highest level is the conceptual view of information and its structure as seen by the user. This must be mapped into a logical structure, which is the second level of description, according to the structure of the data model chosen and the constraints of the DBMS. This logical structure is called the schema and is described in a data definition language (DDL) by a data-base administrator (DBA). Each application program usually has access to only a subset of the data base, called a subschema and defined in a DDL. The third level of description is the actual layout of the data on the physical devices on which it is to reside in the computing system. This description is made using a device-media control language that can take a number of forms, depending on the computing system actually selected. Application programs request data from the DBMS by using a special data-manipulation language (DML). Some data-base management systems permit users to retrieve and manipulate the data through the use of a special nonprocedural language called a query language.

The DBMS is identified by the data-base model it uses to represent the logical structure. There are three main types.: hierarchic model, network model, and relational model. The hierarchic model is a tree structure in which a parent record type can have one or more child record types but a child record type may not have more than one parent record type; i.e., it does not permit a many-to-many relationship between two record types. In the network model, any record type can be related either as a child or parent record type to any number of record types; i.e., a child record can have more than one parent record. The relational model is made from a set of flat tables called relations. The relation is a set of tuples; i.e., if the table has n columns, the relation is said to be of degree n. Mathematical notation drawn from relational algebra and calculus is used to describe relations and operations on them." ("Electronics Engineers' Handbook Second Edition," edited by Donald G. Fink and Donald Christiansen, published by McGraw-Hill Book Company, 1982).

With the increased globalization of information, user's who speak different languages have a need to store information in, and access information from, a common database. Present multi-language relational databases appear to be restricted by form or language. With respect to form, prior art multi-lingual relational databases appear to require every data item provide the same information, and be stored in the same format. With respect to languages, prior art multi-lingual relational databases appear to be limited to a particular language set and do not allow any flexibility in this area. Such a static design structure does not lend itself to a method of storing information in any language, in any language representation, and in any format. Representations include transliterations or romanizations of the sounds of a language that map to meanings.

U.S. Pat. No. 5,442,782, entitled "PROVIDING INFORMATION FROM A MULTI-LINGUAL DATABASE OF LANGUAGE-INDEPENDENT AND LANGUAGE-DEPENDENT ITEMS," discloses a method of internationalizing a database by storing data in one language, referred to as a base language, along with copies of the data in one or more languages other than the base language. The base language is relative to the user. That is, a base language for one user may be different from the base language of another user. The important aspect of U.S. Pat. No. 5,442,782 is that once the data is represented in multiple languages, the data base may be searched in one of the languages that it is represented in. U.S. Pat. No. 5,442,782 does not allow a search in one language using a query in another language as the present invention does. U.S. Pat. No. 5,442,782 is hereby incorporated by reference into the specification of the present invention.

U.S. Pat. No. 5,523,946, entitled "COMPACT ENCODING OF MULTI-LINGUAL TRANSLATION DICTIONARIES," discloses a method of translating words and phrases using a compressed database to reduce the amount of memory required to store the information. U.S. Pat. No. 5,523,946 empowers a hand-held computing device with the ability to perform translations of words and phrases by encoding the words and phrases as token numbers. The token numbers are then related to a map that expands the token back to a word or phrase. U.S. Pat. No. 5,523,946 does not allow for the storage, retrieval, or modification of data in any language representation as the present invention does. U.S. Pat. No. 5,523,946 is hereby incorporated by reference into the specification of the present invention.

U.S. Pat. No. 4,566,078, entitled "CONCURRENT MULTI-LINGUAL USE IN DATA PROCESSING SYSTEMS," discloses a method of providing computer system error messages in the language of the user. U.S. Pat. No. 4,566,078 does not allow for the storage, retrieval, or modification of data in any language representation as the present invention does. U.S. Pat. No. 4,566,078 is hereby incorporated by reference into the specification of the present invention.

U.S. Pat. No. 5,497,319, entitled "MACHINE TRANSLATION AND TELECOMMUNICATIONS SYSTEM,"

discloses a method of translating text into another language. U.S. Pat. No. 5,523,946 includes various language dictionaries for performing translations. U.S. Pat. No. 5,497,319 does not allow for the storage, retrieval, or modification of data in any language representation as the present invention does. U.S. Pat. No. 5,497,319 is hereby incorporated by reference into the specification of the present invention.

SUMMARY OF THE INVENTION

It is an object of the present invention to store, retrieve, and modify data in a database in multiple languages, in multiple language representations, and in multiple formats, concurrently.

It is another object of the present invention to store, retrieve, and modify data in a database in multiple languages, in multiple language representations, and in multiple formats, concurrently, where the user may define the format of the data and the particular language and language representation of the data.

It is another object of the present invention to store, retrieve, and modify data in a database in multiple languages, in multiple language representations, and in multiple formats, concurrently, where the user may define the format of the data and the particular language and language representation of the data, and where the data of one user does not have to match the data of another user with respect to format, language, and language representation.

The objects of the present invention are achieved by a method of storing information in a number of relational column data records. Each data record is identified with a unique data record identifier.

Each data record is made up of one or more data fields. Each data field is given a name by the user and includes the data that the user wishes to associate with each data field name.

Each data field may be associated with one or more attribute records. Each attribute record includes the unique identifier of the data record for which it is associated, the field name for which it is associated, and one or more attribute fields. Each attribute field contains a user-definable attribute name and the data the user wishes to include in the attribute field (i.e., data concerning the associated data field and data record).

The present invention includes a language table that lists all of the language used to store data. Each language has a unique language identifier.

The present invention also includes a language representation table. Each language representation is given a unique language representation pair identifier.

The last table created in the present invention is a data item table that includes each individual data item stored (i.e., field data and attribute data) using the present invention. There will be one entry in the table for each language or language representation of a data item. Each line of the data item table includes the identifier of each data item stored therein; the field name if the data item is a field data item; the attribute name if the data item is an attribute data item; the language representation identifier of the data item (as defined by the user); and the actual data item in the particular language representation (as stored by the user).

For some applications, searches may be accomplished more quickly by including the reverse of the actual data item. Therefore, an extra entry to accommodate the reverse of the actual data item may be included in the data item table.

A user who wishes to store a data record creates the data record with as many field and attributes as necessary. Next, an entry in the data item table is made for each field data item and attribute data item. Each entry includes the identifier for the data record (e.g., the next available data record number, a foreign key, matching identifier for its parent in the data record mentioned above, etc.), the field name if necessary, the attribute name if any, and the language representation identifier for the language representation of the data item, and the data item in the particular language representation. If the language and/or language representation of the data item is not already in the language table and language representation table then the user must make an entry in one or both of these tables.

A user who wishes to search a database that was created using the present invention specifies what the user wants, to the level known by the user. The user gets every item at the level specified and below.

For non-numeric requests, the user only gets field data items or attribute data items in the language and language representation used in the query. The present invention will return all field data items that have the field name that was stored using the language and language representation of the query. If the user wishes to see if there are any similar data entries under that field name but in a different language and language representation then the user must make the query in that particular language and language representation. If no such data item is stored then the user may modify the stored data to include the data item in the desired language and language representation. The user may also delete a particular data item or hierarchy of data items. The user may also modify existing data items.

BRIEF DESCRIPTION OF THE DRAWINGS

FIG. 2 is an illustration of a language table;

FIG. 3 is an illustration of a language representation table; and

FIG. 4 is an illustration of a data item table.

DETAILED DESCRIPTION

Figure 1:
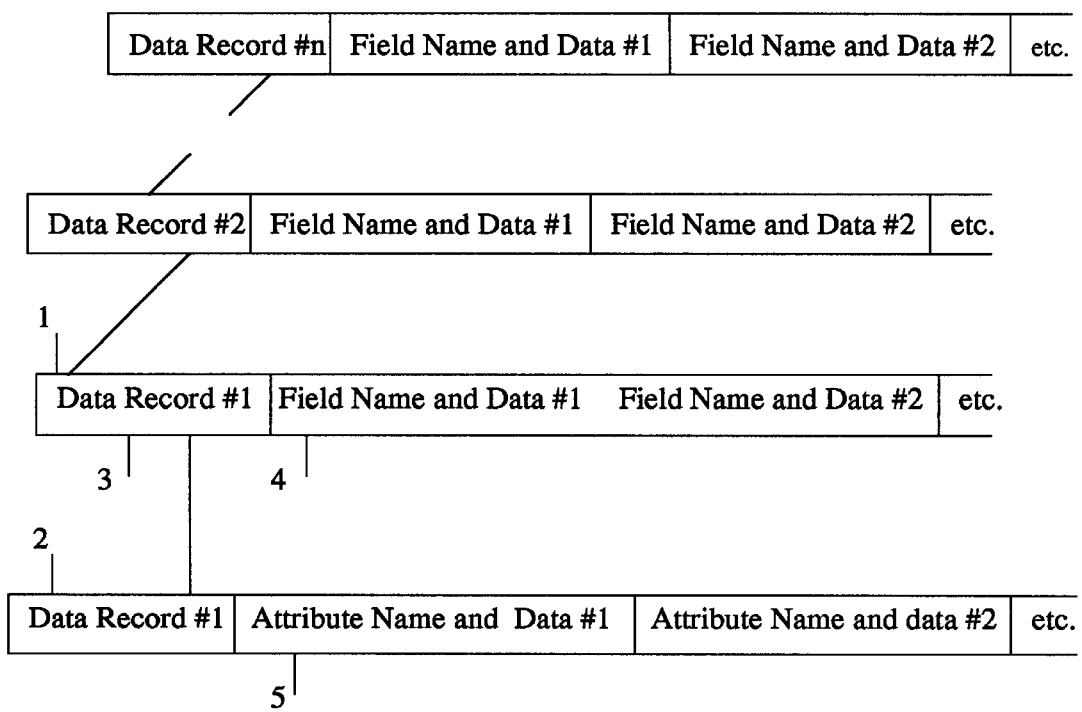
FIG. 1 is an illustration of possible data records and attribute records.

The present invention is a method of storing, retrieving, and modifying data in a database in multiple languages, in multiple language representations, and in multiple formats, concurrently, where the user may define the format of the data and the particular language and language representation of the data, and where the data of one user does not have to match the data of another user with respect to format, language, and language representation.

FIG. 1 is an illustration of a database hierarchy that is possible using the present invention. The database hierarchy includes one or more data records 1 and one or more attribute records 2. Any user may store one or more data records 1. Each data record 1 includes, and is identified by, a unique data record identifier 3. The unique data record identifier 3 may be a unique number or any other suitable identification designator. For example, the first data record may be identified by the number "1," the second data record by the number "2," and so on.

Each data record 1 is made up of one or more data fields 4. The user storing data has the freedom to define each of the data fields 4 to suit the data being stored. Each data field 4 is given a name (i.e., a field name) by the user (e.g., "word", "name", "address", etc.) and includes the data (i.e., field data) that the user wishes to associate with each data field name. For example, data record no. 1 may have a first data field named "word." The word "cat" may be the data associated with the first data field name "word."

The present invention does not require each data record include any of the data field names of any other data record. The user has complete discretion in picking the data field names. By allowing this, the present invention may accommodate one of a kind, or miscellaneous, data.

Each data field 4 may be associated with one or more attribute records 2. Each attribute record 2 includes the unique identifier 3 of the data record 1 for which it is associated, the field name for which it is associated, and one or more attribute fields 5. Each attribute field 5 contains a user-definable attribute name and the data the user wishes to include in the attribute field 5 (i.e., data concerning the associated data field 4 and data record 1). For example, an attribute record for data record serial no. 1 above would include data record serial no. 1, the data field name "word" for which the attribute record is associated, and one or more attribute fields. Each attribute field contains a user-definable attribute field name and additional information that the user wishes to associate with the data field (e.g., "word") of a particular data record (e.g., data record no. 1). For example, the first attribute field may contain the attribute field name "first definition" and data that represents the first definition of the word "cat." A second attribute field, if any, may contain the attribute field name "second definition" and data that represents the second definition of the word "cat," and so on.

FIG. 2 is an illustration of a language table that is used in the present invention. The language table lists all of the languages of the data stored in the present invention (e.g., English, French, Arabic, etc.). Each language has a unique language identifier. The identifier may follow any suitable scheme, but a numbering scheme will suffice (e.g., 1 for English, 2 for French, and 3 for Arabic, etc.). The language table is empty until a data record 1 is stored in a database using the present invention. After data is stored, the user adds the name of the language of the data to the language table and gives the language the next available language identifier (e.g., English, No. 1). By doing this, the present invention is able to accommodate new languages as the need arises. If a language is not used, no resources are spent on it. The architecture of the present invention is flexible enough to accommodate additional languages without being burdened with overhead for a language that is not used.

FIG. 3 is an illustration of a language representation table used in the present invention. A language may be represented using more than one format. For example, Arabic may be represented in the ISO-8859-6 character set in native script or in a transliterated format using the SATTS transliteration or some other format. The language representation identifier may follow any suitable scheme, but a numbering scheme will suffice (e.g., 1 for Arabic in ISSO-8859-6, 2 Arabic in SATTS Transliteration System, etc.). The language representation table is empty until a data record is stored in a database using the present invention. After data is stored, the user adds the identifier of the language used for the stored data to the language representation table, the name of the language representation used, and the identifier of the language representation (e.g., the number "3" for the Arabic language, the number "1" for the Arabic native script format in ISO-8859-6, and the text "Arabic ISO-8859-6" in the language of the data being stored). By doing this, the present invention is able to accommodate new language representations as the need arises. If a language representation is not used, no resources are spent on it. The architecture of the present invention is flexible enough to accommodate additional language representations without being burdened with overhead for a language representation that is not used.

FIG. 4 is an illustration of a data item table that is used in the present invention. The data item table includes each individual data item stored (i.e., field data 4 and attribute data 5) using the present invention. There will be one entry in the data item table for each language or language representation for each data item stored using the present invention. For example, there would be three entries in the table if the word "cat" were stored in the English alphabet, in ASCII, and in the French alphabet. Each line of the data item table includes the identifier of each data item stored therein; the field name if the data item is a field data item; the attribute name if the data item is an attribute data item; the language representation identifier of the data item (as defined by the user); and the actual data item in the particular language representation (as stored by the user). No entry is needed for the language since the language may be determined from the language representation table using the language representation identifier stored in the data item table.

For some applications, searches may be accomplished more quickly by including the reverse of the actual data item. Therefore, an extra entry (not shown) to accommodate the reverse of the actual data item may be included in the data item table.

A user who wishes to store a data record 1 creates the data record 1 with as many data fields 4 and attribute fields 5 as necessary. Next, an entry in the data item table is made for each field data item and attribute data item. Each entry includes the unique identifier for the data record 1 (e.g., the next available data record number), the field name if any, the attribute name if any, and the language representation identifier for the language representation of the data item, and the data item in the particular language representation. Each entry for a particular data record uses the same data record identifier. This is how the various entries are associated with each other.

In an alternate embodiment, an additional entry may be made in each line of the data item table. That is, the reverse of the data item may be included in the data item table. It may be faster to search for a reverse of the data item then the actual data item. If the language and/or language representation of the data item is not already in the language table and language representation table then the user must make an entry in one or both of these tables.

For example, if ASCII was not used before the latest data item was stored, then the user must enter "English" in the language table, if "English" had not previously been entered therein, along with the next available language identifier (e.g., the next available language number) that will be used to identify the English language. Next, the user would enter "ASCII" in the language representation table along with the language identifier (e.g., the identifier for English) and the next available language representation identifier to represent ASCII (e.g., the next available language representation number).

A user who wishes to search a database that was created using the present invention requests a certain item to a certain level known by the user. The user gets every item at the level specified and every item below that level that is associated with the item requested. That is, if the user requests data record no. 1, the user gets every field data item and every attribute data item associated with data record no. 1 in whatever language and language representation the item was stored.

For non-numeric requests, the user only gets field data items or attribute data items in the language and language representation used in the query. For example, the user may request all data entries for a particular field name. The present invention will return all field data items that have that field name that was stored using the language and language representation of the query. If the user wishes to see if there are any similar data entries under that field name but in a different language and language representation then the user must make the query in that particular language and language representation. If no such data item is stored then the user may modify the stored data to include the data item in the desired language and language representation. The user may also delete a particular data item or hierarchy of data items. The user may also modify existing data items (e.g., modifying an address or definition).

What is claimed is:

1. A method of storing, retrieving, and modifying data in a database, comprising the steps of:
   a) creating at least one data record, by at least one user, in a user-definable language and user-definable language representation, where the user-definable language and the user-definable language representation used by one of the at least one user does not have to be used by another of the at least one user, where each of the at least one data record has a unique identifier, where the at least one data record includes at least one data field, where each of the at least one data field is identified by a user-definable field name, and where the field name of the at least one data field for one of the at least one user does not have to be used by another of the at least one user;
   b) storing, by the at least one user, each of the at least one data field on a separate line in a data item table along with the unique identifier of the corresponding at least one data record, the at least one field name corresponding to the at least one data field being stored, and the language representation identifier for the language representation of the corresponding at least one data field being stored;
   c) retrieving, by the at least one user, the at least one data record using a user-definable language and language representation, where the user-definable language and user-definable language representation used by one of the at least one user does not have to be used by another of the at least one user; and
   d) modifying, by the at least one user, the at least one data record using a user-definable language and language representation, where the user-definable language and user-definable language representation used by one of the at least one user does not have to be used by another of the at least one user.

2. The method of claim 1, wherein said step of creating at least one data record is further comprised of the step of creating at least one data record, by at least one user, in a user-definable language and user-definable language representation, where the user-definable language and the user-definable language representation used by one of the at least one user does not have to be used by another of the at least one user, where the at least one data field corresponding to the at least one data record includes at least one attribute field, where each of the at least one attribute field is identified by a user-definable attribute name, and where the attribute name of the at least one attribute field for one of the at least one user does not have to be used by another of the at least one user.

3. The method of claim 2, wherein said step of storing is further comprised of the step of storing, by the at least one user, each of the at least one attribute field on a separate line in the data item table along with the unique identifier of the corresponding at least one data record, the at least one attribute name corresponding to the at least one attribute field being stored, and the language representation identifier for the language representation of the corresponding at least one attribute field being stored.

4. The method of claim 1, wherein said step of retrieving further comprises retrieving, by the at least one user, the at least one data field using a user-definable language and language representation, where the user-definable language and user-definable language representation used by one of the at least one user does not have to be used by another of the at least one user.

5. The method of claim 3, wherein said step of retrieving further comprises retrieving, by the at least one user, the at least one attribute field using a user-definable language and language representation, where the user-definable language and user-definable language representation used by one of the at least one user does not have to be used by another of the at least one user.

6. The method of claim 1, wherein said step of modifying further comprises deleting, by the at least one user, the at least one data record using a user-definable language and language representation, where the user-definable language and user-definable language representation used by one of the at least one user does not have to be used by another of the at least one user.

7. The method of claim 1, wherein said step of modifying further comprises adding, by the at least one user, the at least one data record using a user-definable language and language representation, where the user-definable language and user-definable language representation used by one of the at least one user does not have to be used by another of the at least one user.

8. The method of claim 1, wherein said step of modifying further comprises modifying, by the at least one user, the at least one data field using a user-definable language and language representation, where the user-definable language and user-definable language representation used by one of the at least one user does not have to be used by another of the at least one user.

9. The method of claim 1, wherein said step of modifying further comprises deleting, by the at least one user, the at least one data field using a user-definable language and language representation, where the user-definable language and user-definable language representation used by one of the at least one user does not have to be used by another of the at least one user.

10. The method of claim 1, wherein said step of modifying further comprises adding, by the at least one user, the at least one data field using a user-definable language and language representation, where the user-definable language and user-definable language representation used by one of the at least one user does not have to be used by another of the at least one user.

11. The method of claim 3, wherein said step of modifying further comprises modifying, by the at least one user, the at least one attribute field using a user-definable language and language representation, where the user-definable language and user-definable language representation used by one of the at least one user does not have to be used by another of the at least one user.

12. The method of claim 3, wherein said step of modifying further comprises deleting, by the at least one user, the at least one attribute field using a user-definable language and language representation, where the user-definable language and user-definable language representation used by one of the at least one user does not have to be used by another of the at least one user.

13. The method of claim 3, wherein said step of modifying further comprises adding, by the at least one user, the at least one attribute field using a user-definable language and language representation, where the user-definable language and user-definable language representation used by one of the at least one user does not have to be used by another of the at least one user.

14. The method of claim 1, wherein said step of storing is further comprised of the step of storing, by the at least one user, a reverse of each of the at least one data field.

15. The method of claim 3, wherein said step of storing is further comprised of the step of storing, by the at least one user, a reverse of each of the at least one attribute field.

* * * * *